United States Patent
Oh et al.

(10) Patent No.: US 10,802,216 B2
(45) Date of Patent: Oct. 13, 2020

(54) POLARIZATION ROTATOR WITH DIMENSIONED RIB WAVEGUIDE AND A POLARIZATION STABILIZER

(71) Applicant: Rockley Photonics Limited, London (GB)

(72) Inventors: Dong Yoon Oh, Alhambra, CA (US); Aaron John Zilkie, Pasadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 16/362,528

(22) Filed: Mar. 22, 2019

(65) Prior Publication Data
US 2019/0302361 A1 Oct. 3, 2019

Related U.S. Application Data

(60) Provisional application No. 62/649,476, filed on Mar. 28, 2018.

(30) Foreign Application Priority Data

May 1, 2018 (GB) .................................... 1807148

(51) Int. Cl.
*G02B 6/126* (2006.01)
*G02B 6/27* (2006.01)
(Continued)

(52) U.S. Cl.
CPC ............. *G02B 6/126* (2013.01); *G02B 6/122* (2013.01); *G02B 6/2733* (2013.01); *G02B 6/2773* (2013.01); *G02B 2006/12061* (2013.01)

(58) Field of Classification Search
CPC ...... G02B 6/126; G02B 6/2773; G02B 6/122; G02B 6/2733; G02B 2006/12061
See application file for complete search history.

(56) References Cited

U.S. PATENT DOCUMENTS

| 4,492,436 A * | 1/1985 | Bergmann | G02B 27/12 |
| | | | 359/485.02 |
| 6,198,854 B1 | 3/2001 | Takagi | |

(Continued)

FOREIGN PATENT DOCUMENTS

| EP | 3 002 616 A1 | 4/2016 |
| EP | 3 009 869 A1 | 4/2016 |

OTHER PUBLICATIONS

Boeuf, F. et al., "A Multi-wavelength 3D-compatible Silicon Photonics Platform on 300mm SOI wafers for 25Gb/s Applications", 2013, 4 pages, IEEE.

(Continued)

*Primary Examiner* — Andrew Jordan
(74) *Attorney, Agent, or Firm* — Lewis Roca Rothgerber Christie LLP

(57) ABSTRACT

A polarization rotator and a polarization stabilizer. The polarization rotator includes a rib waveguide. The rib waveguide including: a slab portion; and a ridge portion, which is disposed along a surface of the slab portion. The slab portion has a first slab region whose width, as measured in a direction perpendicular to a guiding direction of the waveguide, increases from a first slab width to a second slab width along a first length, and the ridge portion has a first ridge region whose width, as measured in the same direction as the slab widths, decreases from a first ridge width to a second ridge width along the same first length; such that the rotator is configured to rotate the polarization of light during its transmission through the rib waveguide.

22 Claims, 14 Drawing Sheets

(51) Int. Cl.
  *G02B 6/122* (2006.01)
  *G02B 6/12* (2006.01)

(56) References Cited

U.S. PATENT DOCUMENTS

| | | | | |
|---|---|---|---|---|
| 7,006,732 B2* | 2/2006 | Gunn, III | ............ | G02B 6/1228 359/629 |
| 7,068,887 B1* | 6/2006 | Gunn, III | ............ | G02B 6/1228 359/629 |
| 7,228,015 B2* | 6/2007 | Watts | ............ | G02B 6/126 385/11 |
| 7,298,945 B2 | 11/2007 | Gunn, III et al. | | |
| 7,702,188 B2* | 4/2010 | Little | ............ | G02B 6/1228 385/28 |
| 8,094,978 B2* | 1/2012 | Tokushima | ............ | G02B 6/1228 385/11 |
| 8,238,697 B2* | 8/2012 | Little | ............ | G02B 6/1228 385/28 |
| 8,620,115 B2* | 12/2013 | Webster | ............ | G02F 1/2257 385/1 |
| 8,750,651 B2* | 6/2014 | Chen | ............ | G02B 6/105 385/11 |
| 8,913,854 B2* | 12/2014 | Chen | ............ | G02B 6/105 385/11 |
| 8,923,660 B2* | 12/2014 | Dorin | ............ | G02F 1/025 385/3 |
| 8,948,549 B2* | 2/2015 | Picard | ............ | G02B 6/2766 385/11 |
| 9,110,241 B2* | 8/2015 | Chen | ............ | G02B 6/105 |
| 9,529,151 B2* | 12/2016 | Goi | ............ | G02B 6/126 |
| 9,664,853 B2* | 5/2017 | Vermeulen | ............ | G02B 6/1228 |
| 9,864,141 B1* | 1/2018 | Lin | ............ | G02B 6/126 |
| 9,915,781 B1* | 3/2018 | Lin | ............ | G02B 6/126 |
| 9,977,187 B2* | 5/2018 | Shi | ............ | G02B 6/125 |
| 10,101,532 B1* | 10/2018 | Lin | ............ | G02B 6/126 |
| 10,133,002 B2* | 11/2018 | Lin | ............ | G02B 6/126 |
| 10,393,967 B2* | 8/2019 | Piazza | ............ | G02B 6/1228 |
| 10,591,672 B2* | 3/2020 | Van Thourhout | ............ | G02B 6/2861 |
| 2004/0184156 A1* | 9/2004 | Gunn, III | ............ | G02B 6/1228 359/629 |
| 2006/0008207 A1* | 1/2006 | Gunn, III | ............ | G02B 6/1228 385/37 |
| 2006/0018584 A1* | 1/2006 | Watts | ............ | G02B 6/126 385/11 |
| 2006/0280405 A1* | 12/2006 | Gunn, III | ............ | G02B 6/1228 385/37 |
| 2008/0019637 A1* | 1/2008 | Little | ............ | G02B 6/1228 385/28 |
| 2010/0002989 A1* | 1/2010 | Tokushima | ............ | G02B 6/1228 385/14 |
| 2010/0202724 A1* | 8/2010 | Little | ............ | G02B 6/1228 385/5 |
| 2011/0222813 A1 | 9/2011 | Webster et al. | | |
| 2012/0163750 A1* | 6/2012 | Chen | ............ | G02B 6/105 385/3 |
| 2014/0054263 A1* | 2/2014 | Chen | ............ | G02B 6/105 216/24 |
| 2014/0153862 A1* | 6/2014 | Picard | ............ | G02B 6/126 385/11 |
| 2014/0348460 A1 | 11/2014 | Dorin et al. | | |
| 2015/0063744 A1* | 3/2015 | Chen | ............ | G02B 6/105 385/3 |
| 2015/0078702 A1* | 3/2015 | Dorin | ............ | G02F 1/2257 385/3 |
| 2015/0338577 A1* | 11/2015 | Shi | ............ | G02B 6/126 385/11 |
| 2016/0011371 A1* | 1/2016 | Vermeulen | ............ | G02B 6/1228 385/14 |
| 2016/0178842 A1* | 6/2016 | Goi | ............ | G02B 6/126 385/11 |
| 2017/0205578 A1 | 7/2017 | Van Thourhout et al. | | |
| 2018/0164505 A1* | 6/2018 | Lin | ............ | G02B 6/126 |
| 2018/0284348 A1* | 10/2018 | Lin | ............ | G02B 6/126 |
| 2018/0321445 A1* | 11/2018 | Piazza | ............ | G02B 6/1228 |
| 2019/0258094 A1* | 8/2019 | Oh | ............ | G02F 1/025 |
| 2019/0302361 A1* | 10/2019 | Oh | ............ | G02B 6/2733 |
| 2020/0133034 A1 | 4/2020 | Schrans et al. | | |
| 2020/0158952 A1* | 5/2020 | Ma | ............ | G02B 6/125 |

OTHER PUBLICATIONS

Zhang, Jing et al., "Silicon-Waveguide-Based Mode Evolution Polarization Rotator", IEEE Journal of Selected Topics in Quantum Electronics, Jan./Feb. 2010, pp. 53-60, vol. 16, No. 1, IEEE.

U.K. Intellectual Property Office Search Report, dated Oct. 29, 2018, for Patent Application No. GB 1807148.0, 4 pages.

Lu, Zeqin et al, "Silicon Photonic Polarization Beamsplitter and Rotator for On-chip Polarization Control", 2016 IEEE 13th International Conference on Group IV Photonics (GFP), Shanghai, 2016, pp. 70-71, IEEE.

U.K. Intellectual Property Office Search and Examination Report, dated May 1, 2019, for Patent Application No. GB 1817733.7, 6 pages.

U.K. Intellectual Property Office Search Report, dated Aug. 1, 2019, for Patent Application No. GB 1817733.7, 3 pages.

\* cited by examiner

POLARIZATION ROTATOR WITH DIMENSIONED RIB WAVEGUIDE AND A POLARIZATION STABILIZER

CROSS-REFERENCE TO RELATED APPLICATION(S)

The present application claims priority to and the benefit of U.S. Provisional Application No. 62/649,476, filed Mar. 28, 2018, entitled "POLARIZATION CONTROLLER"; the present application also claims priority to United Kingdom Patent Application No. GB1807148.0, filed May 1, 2018. The entire contents both of the applications identified in this paragraph are incorporated herein by reference.

FIELD

The present invention relates to a polarization rotator and accompanying polarization stabilization device, and particularly to a polarization rotator built on a micron scale silicon platform.

BACKGROUND

Generally, optical waveguides have different propagation profiles for transverse-electric (TE) and transverse-magnetic (TM) light. This can cause different optimum operating wavelength ranges of silicon photonic devices which use light of these two polarizations. For a large waveguide, this effect can be quite small. However, for a small waveguide or a waveguide that includes a two-dimensional structure (for example, quantum wells which are polarization-sensitive) the effect can be quite large. For example, some 1310 nm QCSE modulators only work for TE polarized light.

In some devices, a transmitted photonic-integrated-circuit chip includes at least one polarization-sensitive modulator which is driven by off-chip laser light. The light is coupled into the chip by a single mode optical fibre. The polarization of the light coming from this optical fibre is generally random, and so the performance of the polarization-sensitive modulator is not reliable.

It is generally known to rotate the polarization of light in, for example, a 220 nm silicon-on-insulator (SOI) waveguide platform. This is achievable as the mode hybridization effect utilized in these devices during adiabatic mode conversion is relatively strong as compared to the size of the device. However, such devices are not applicable to micron-scale waveguide platforms as the ultimate polarization rotator would need to be on the order of centimetres (and so wholly unsuitable for implementation on a photonic-integrated-circuit). Accordingly, there is a need to provide a polarization rotator which is usable with micron-scale waveguide platform whilst also being suitable for implementation in a photonic-integrated-circuit.

SUMMARY

In a first aspect, embodiments of the invention provide a polarization rotator, including a rib waveguide, the rib waveguide including:
a slab portion; and
a ridge portion, which is disposed along a surface of the slab portion;
wherein:
the slab portion has a first slab region whose width, as measured in a direction perpendicular to a guiding direction of the waveguide, increases from a first slab width to a second slab width along a first length, and
the ridge portion has a first ridge region whose width, as measured in the same direction as the slab widths, decreases from a first ridge width to a second ridge width along the same first length;
such that the rotator is configured to rotate the polarization of light during its transmission through the rib waveguide.

The rib waveguide may be a silicon waveguide. Alternatively, the waveguide may be made of a III-V semiconductor. For example, in some examples the waveguide is made from indium phosphide or gallium arsenide.

In a second aspect, embodiments of the invention provide a polarization stabilizer, including:
an input port;
a polarization-dependent splitter, which is connected to the input port and has two output ports; and
a polarization rotator, connected to one of the output ports of the polarization-dependent splitter;
wherein the polarization-dependent splitter divides light received at the input port into a transverse-magnetic portion and a transverse-electric portion, one of which is delivered to the output port connected the polarization rotator.

Optional features of some embodiments of the invention will now be set out. These are applicable singly or in any combination with any aspect of the invention.

The polarization rotator may have a length along the guiding direction of the waveguide of no less than 400 µm and no more than 950 µm.

The rib waveguide may have a height, as measured from a lower surface of the slab to an upper surface of the ridge, of no less than 0.5 µm and no more than 1.5 µm. This height may represent the height of the slab plus the ridge portion.

More than 50% of the rotation may occur as light passes along the first length.

The slab may include a second slab region whose width remains constant along a second length. A guiding direction of the first slab region may be substantially aligned with a guiding direction of the second slab region.

The first slab width may be no less than 0.5 µm and no more than 2 µm. The second slab width may be no less than 1 µm and no more than 2 µm.

The ridge may include a second ridge region whose width remains constant along a second length. A guiding direction of the first ridge region may be at an angle greater than 0° with a guiding direction of the second ridge region. The second length may be no less than 100 µm and no more than 150 µm and/or the first length may be no less than 300 µm and no more than 800 µm.

The polarization rotator may be operable at a wavelength of no less than 1.1 µm and no more than 1.7 µm.

The polarization rotator may further include an input waveguide, connecting an input port of the polarization rotator to input ports of the first ridge region and first slab region, and whose width tapers inwards in a direction from the input port of the rotator to the input ports of the first ridge region and first slab region.

The polarization rotator may further include an output waveguide, connecting output ports of the second ridge region and second slab region to an output port of the polarization rotator, and whose width broadens outwards in a direction from the output ports of the second ridge region and the second slab region to the output port of the polarization rotator.

The polarization rotator may have an output port, connected to a first waveguide which includes at least one heater, said heater being operable to alter the phase of light transmitted through the first waveguide.

The polarization-dependent splitter may be connected to a second waveguide, and both the second waveguide and the first waveguide are connected to respective input ports of a coupler.

The polarization-dependent splitter may be formed of a first intermediate waveguide and a second intermediate waveguide, both of which are coupled to the input port and which are respectively coupled to the output ports.

The first intermediate waveguide may have a width which reduces from a first width to a second width along a direction parallel to the guiding direction of the waveguide.

The second intermediate waveguide may have a width which increases from a first width to a second width along a direction parallel to the guiding direction of the waveguide.

The polarization-dependent splitter may be operable to provide TM0 polarized light at a first output port of the two output ports, and TE0 polarized light at a second output port of the two output ports.

The polarization rotator may connected to the first output port and is operable to rotate the received light so as to output TE0 polarized light.

The polarization rotator as used in the polarization stabilizer may be as set out with respect to the first aspect.

BRIEF DESCRIPTION OF THE DRAWINGS

Embodiments of the invention will now be described by way of example with reference to the accompanying drawings in which.

DETAILED DESCRIPTION

Figure 1A:
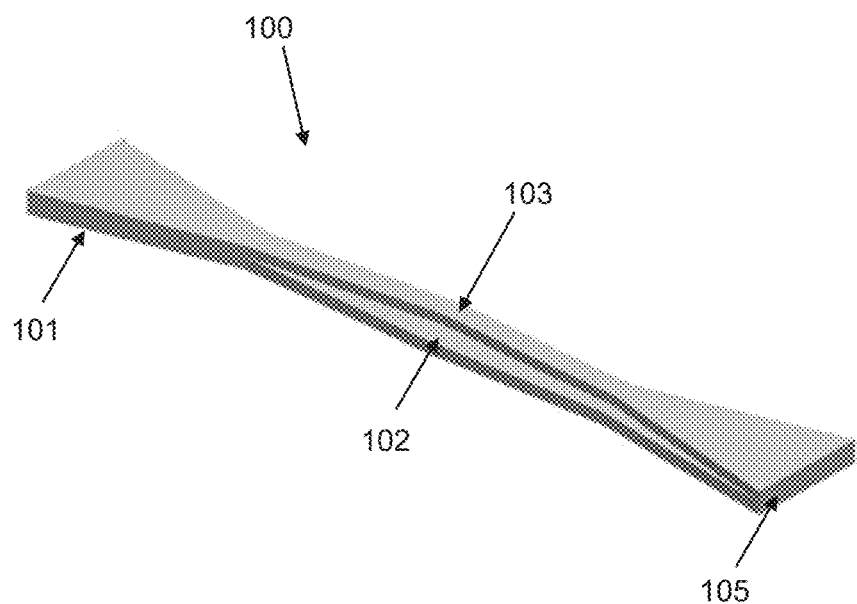
FIGS. 1A and 1B show perspective views of a polarization rotator according to embodiments of the present invention.
Figure 1B:
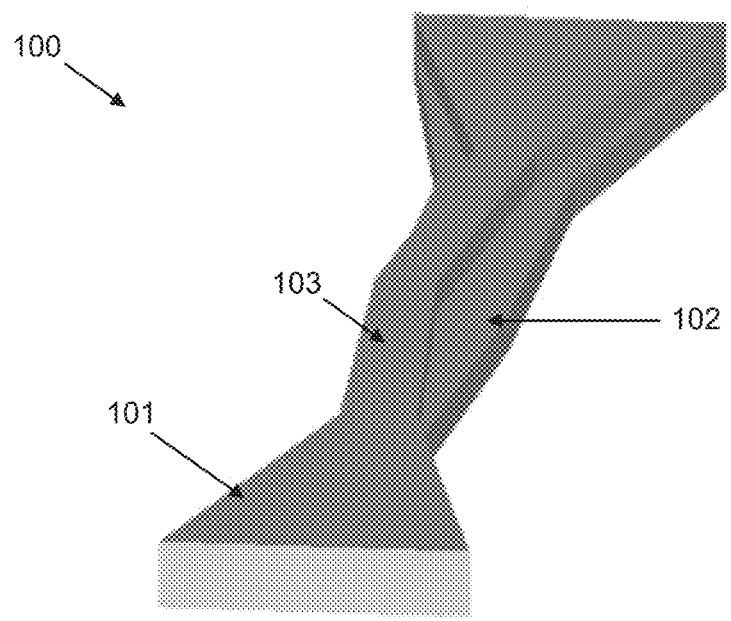

Aspects and embodiments of the present invention will now be discussed with reference to the accompanying figures. Further aspects and embodiments will be apparent to those skilled in the art. All documents mentioned in this text are incorporated herein by reference FIGS. 1A and 1B show perspective views of a polarization rotator 100 according to embodiments of the present invention. Broadly, the rotator can be considered to comprise: an input waveguide 101, rib waveguide formed of a slab portion 102 and a ridge portion 103, and an output waveguide 105. Light enters the rotator into the input waveguide 101, which decreases in width until it matches a first width of the rib waveguide. As the light passes through the rib waveguide, the polarization thereof rotates from TM to TE or vice versa. The nature of the rib waveguide is discussed in more detail below. Once the light has passed through the rib waveguide, it enters the output waveguide. The width of the output waveguide increases to match that of the next optical component connected to the rotator. Generally, the polarization rotator has a height t, of around 1 µm i.e. as measured from a lowermost surface to an uppermost surface of the polarization rotator. The slab portion 102 generally has a height $t_{slab}$ of around 0.5 µm or 0.55 µm, and the ridge portion also has a height $t_{ridge}$ of around 0.5 µm or a height of around 0.45 µm. As the ridge portion is atop the portion, the entire rotator has a height of around 1 µm.

Notably, the device is able to perform direct conversion from a TM0 polarization state to a TE0 polarization state, i.e. not necessarily via a TE1 polarization state.

Figure 2:
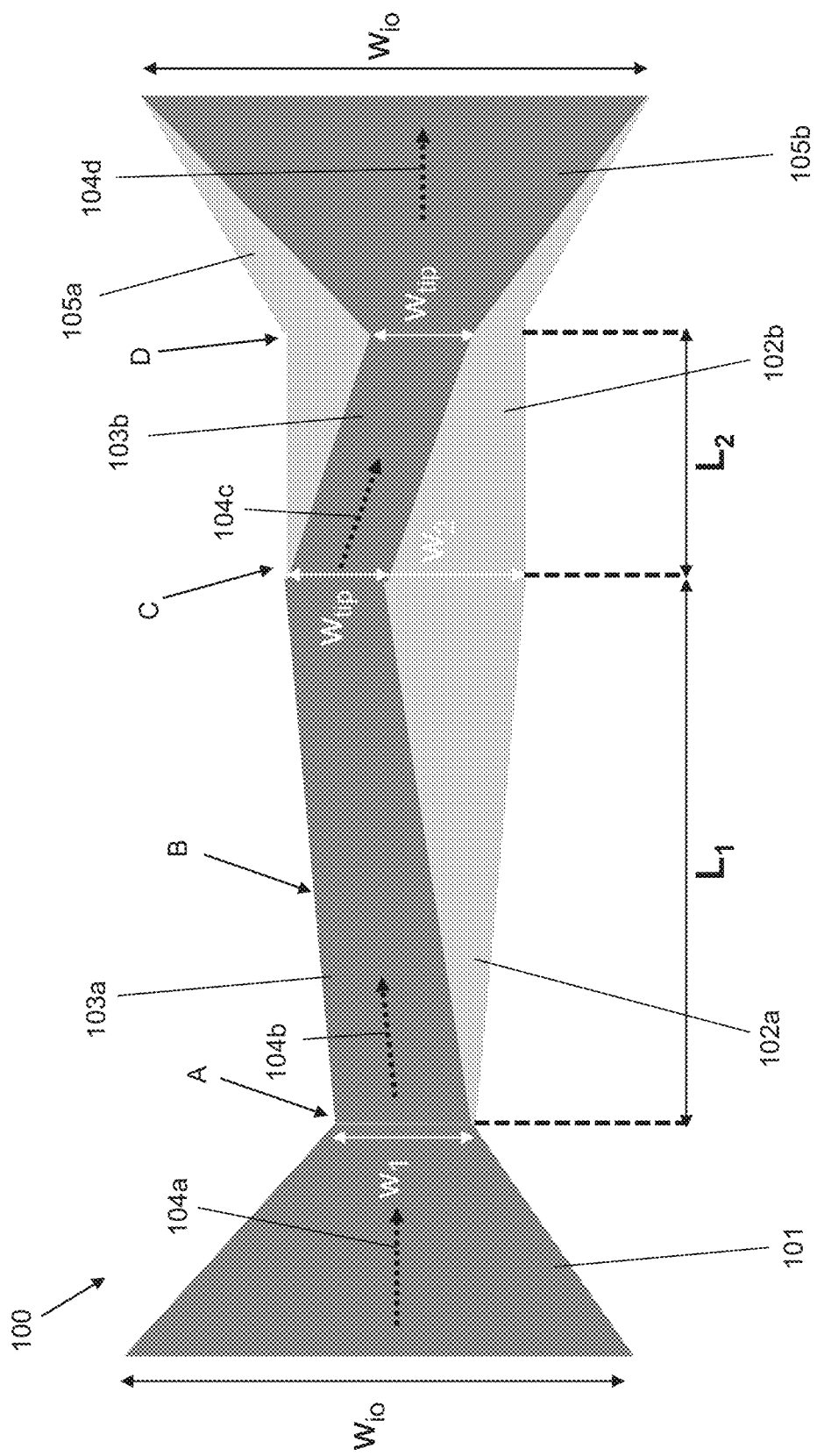
FIG. 2 shows a top-down view of the polarization rotator of FIGS. 1A and 1B.

FIG. 2 shows a top-down view of the polarization rotator 100 shown in FIGS. 1A and 1B. As can be seen, the input waveguide 101 has a first width $w_{io}$ which decreases to a second width $w_1$ where the input waveguide connects to the rib waveguide. The input waveguide has a guiding direction 104a, which is generally aligned with the guiding direction 104d of the output waveguide. Of note, is that the guiding direction of the slab portion 102 is generally aligned with the guiding direction of the input and output waveguides, i.e. 104a and 104d. Whereas, guiding directions 104b and 104c of the ridge portion 103 are not aligned with the guiding direction 104a and 104d of the input and output waveguides.

As discussed previously, the rib waveguide comprises a ridge portion and a slab portion. Each of these can be conceptually divided into first and second portions. Taking the slab portion first, it has a first slab portion 102a and a second slab portion 102b connected to one another. The width of the slab portion increases from $w_1$, where the first slab portion connects to the input waveguide, to $w_2$ where the first slab portion 102a connects to the second slab portion 102b over the length $L_1$. The width of the second slab portion is substantially constant over the length $L_2$ as shown.

In contrast, a first ridge portion 103a decreases in width from $w_1$, where the first ridge portion connects to the input waveguide, to $w_{tip}$ where the first ridge portion 103a connects to the second ridge portion 103b. The width of the second ridge portion is substantially constant, and the second ridge portion links the first ridge portion to the output waveguide. The output waveguide 105 can also be considered to have a slab portion 105a and a ridge portion 105b whose widths respectively increase from $w_2$ and $w_{tip}$ to $w_{io}$. The input waveguide 101 and output waveguide 105 in this example have a length of around 80 µm. The second ridge portion 103b brings the ridge to the centre of the output waveguide 105. The distance from the input waveguide—slab interface to the slab—output waveguide interface, i.e. the length of the slab region or $L_1+L_2$, may be at least 520 µm and no more than 820 µm. The input and output waveguides may have a length of around 80 µm.

As was discussed previously, the majority of the rotation occurs along $L_1$ i.e. in the first ridge portion and first slab portion. Advantageously, this means that the design is robust against variations in the tip width ($w_{tip}$).

In one example of the rotator discussed above, t=1 µm, $t_{slab}$=0.55 µm, $w_1$=0.75 µm, $w_{tip}$=0.5 µm, $w_2$=1.3 µm, $L_1$ takes a value of at least 400 µm and no more than 700 µm, and $L_2$=120 µm. Such a device displays a polarization extinction ratio, defined in this example as the (TM→TE transmission)/(TM→TM transmission) of greater than 13 dB. The device also has a conversion efficiency, defined as the TM→TE transmission of greater than −0.2 dB, where the variation in $w_{tip}$ is within the range 0.2 µm-0.6 µm.

Figure 3A:
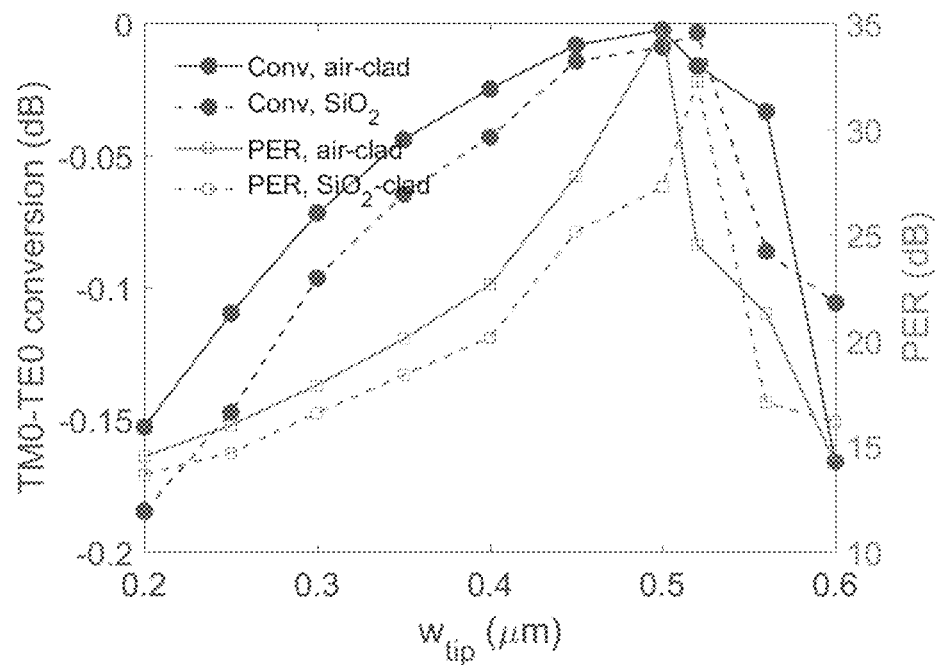
FIGS. 3A-3E show the simulated device performance with respect to variations in geometrical parameters and wavelengths.
Figure 3B:
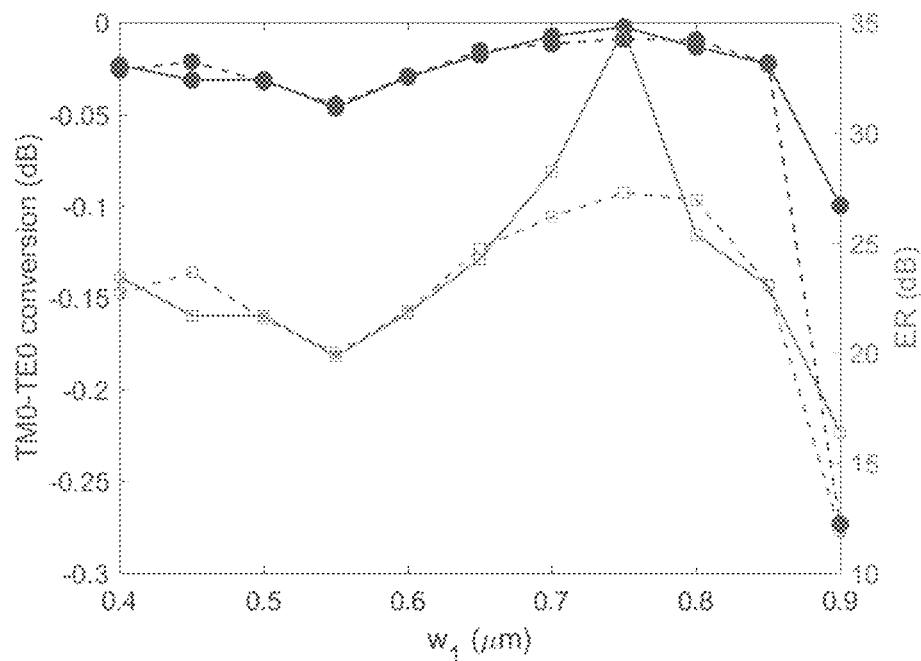
Figure 3C:
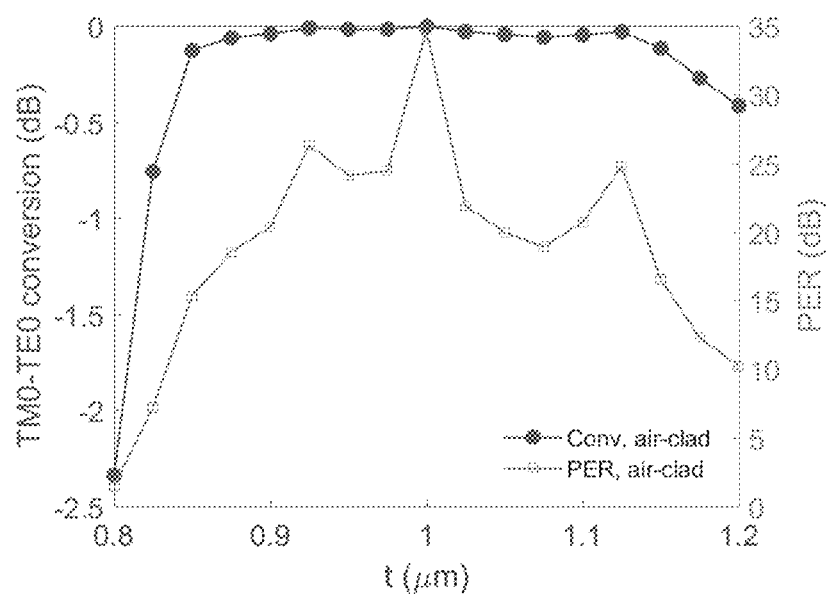
Figure 3D:
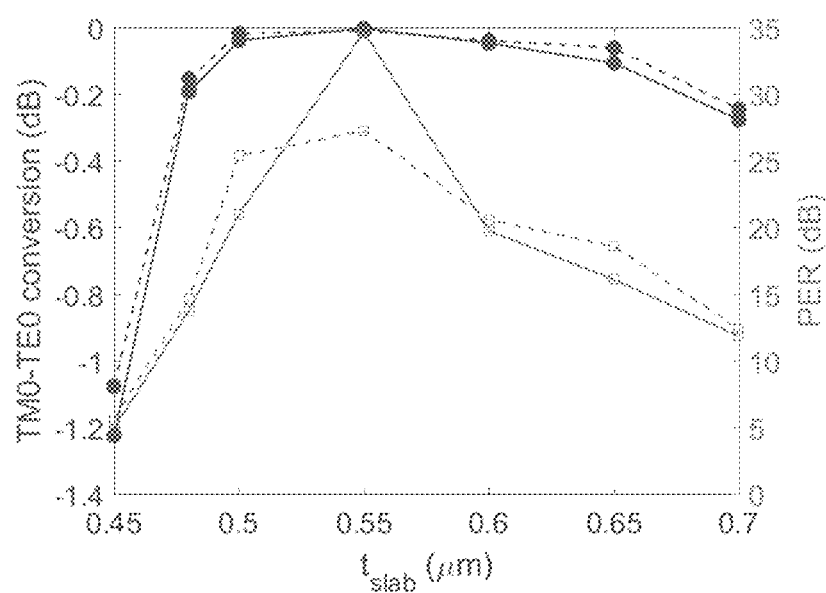
Figure 3E:
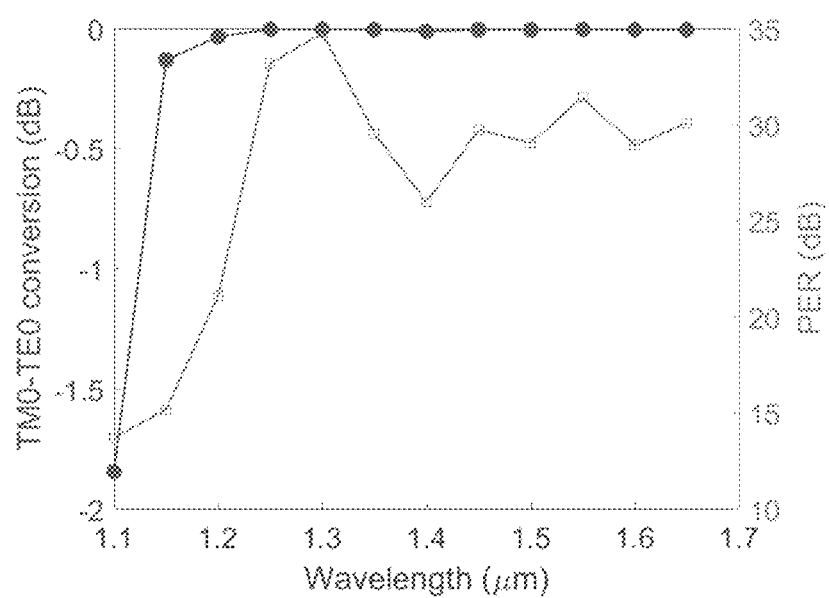

FIGS. 3A-3E show the simulated device performance with respect to variations in geometrical parameters and wavelengths. The wavelength was set for 1.3 µm for the simulation results in FIGS. 3A-3D. The device's performance meets the above polarization extinction ratio and the conversion efficiency when $w_1$ is within the range 0.4 µm-0.85 µm, t within the range 0.85 µm-1.12 µm, or $t_{slab}$ is within the range 0.48 µm-0.65 µm. The device's performance was insensitive to oxide deposition, and the device worked well with either air cladding or an oxide cladding on top. FIG. 3E shows the simulation result which were acquired for a wavelength range of 1.1 µm-1.65 µm, showing that the device works across the O-, C-, and L-bands. These results show that the polarization rotator is ultra-broadband and robust against fabrication variations.

Figure 4A:
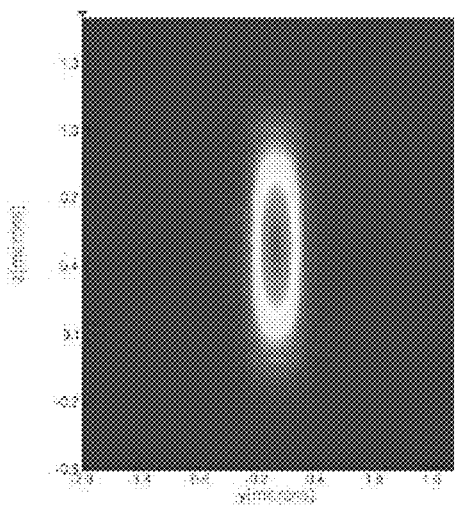
FIGS. 4A-4D show the simulated optical mode within various parts of the polarization rotator of FIG. 2 as viewed in cross-section.
Figure 4B:
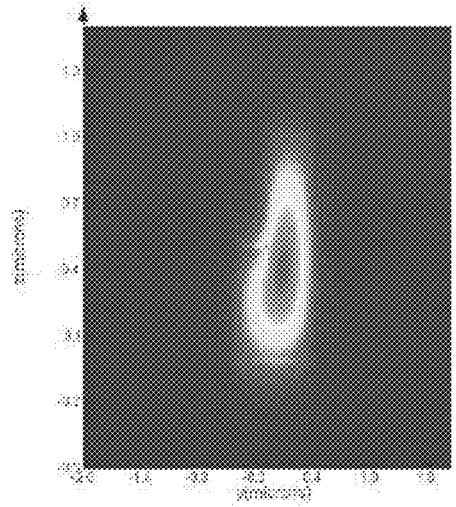
Figure 4C:
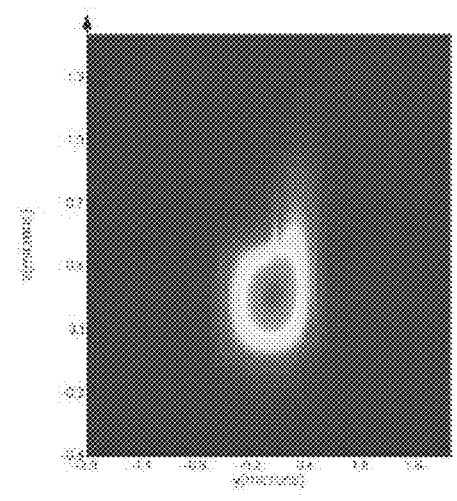
Figure 4D:
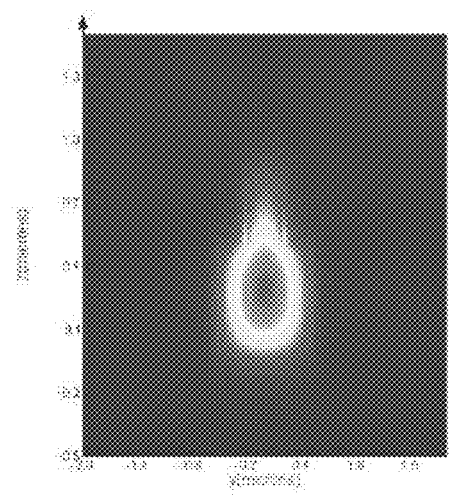

FIGS. 4A-4D show the simulated optical mode within various parts of the polarization rotator of FIG. 2 as viewed in cross-section. FIG. 4A shows the simulated optical mode at point A as shown in FIG. 2. Here the light is in a transverse-magnetic (TM) polarization state. Next, as the light moves to point B, some of the light has rotated as shown in FIG. 4B. By the time the light has reached point C the majority of the light has rotated from a TM to a TE polarization state. This is shown in FIG. 4C. A small degree of further rotation occurs as the light moves from point C to point D, as shown in FIG. 4D.

Figure 5:
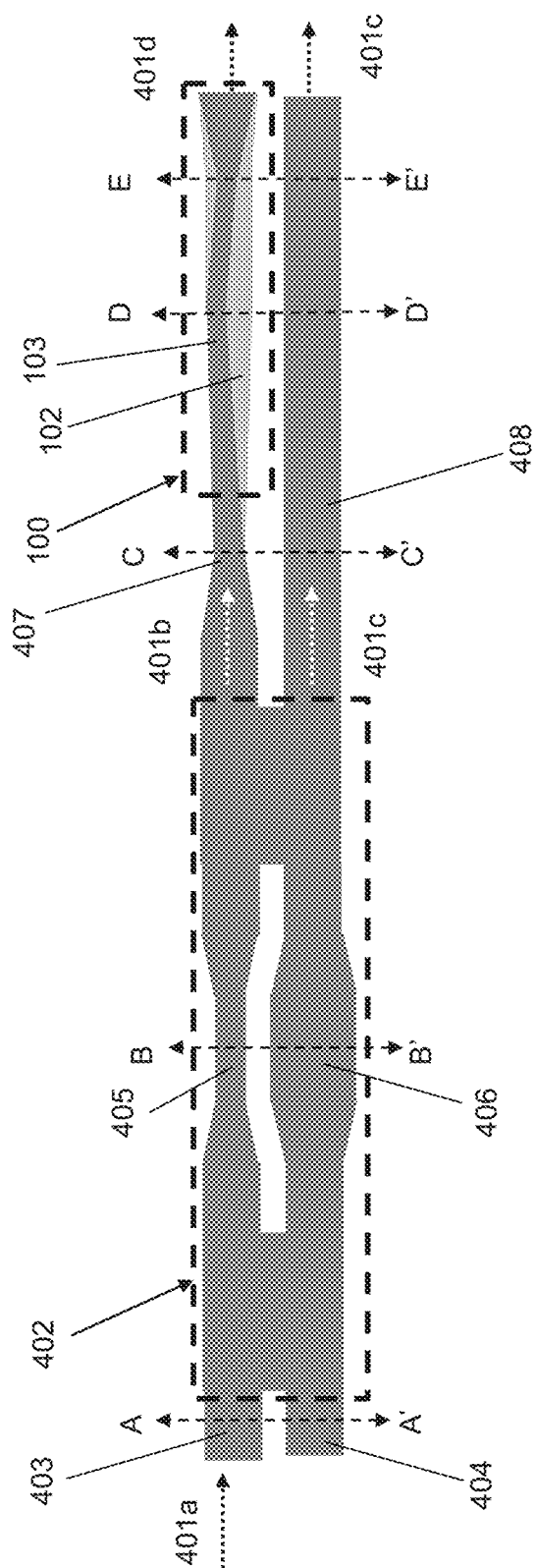
FIG. 5 shows a top-down view of polarization stabilizer according to embodiments of the present invention.

FIG. 5 shows a top-down view of a polarization stabilizer according to embodiments of the present invention. Broadly, the device comprises an input waveguide 403 which is connected to a polarization splitter 402. There is a second input waveguide 404, which may or may not be used to provide light into the splitter. This polarization splitter is connected to respective output waveguides 407 and 408, one of which is connected to a polarization rotator 100 as described above. The polarization splitter broadly comprises a first intermediate waveguide 405 and a second intermediate waveguide, one of which having a width less than the other. In this example, the width of the first intermediate waveguide is less than that of the second intermediate waveguide. Light 401a entering the stabilizer is generally of a mixed polarization state, and so has a component which is polarized in a TM state and a component which is polarized in a TE state. The polarization splitter 402 operates such that one of the output waveguides receives light which is only TE polarized and the other output waveguide receives light which is only TM polarized. In this example, TM polarized light 401b is provided into the first output waveguide 407 and TE polarized light 401c is provided to the second output waveguide 408. The TM polarized light 401b then passes through the polarization rotator 100, thereby becoming TE polarized light 401d. The output of the polarization stabilizer is therefore only TE polarized.

Figure 6A:
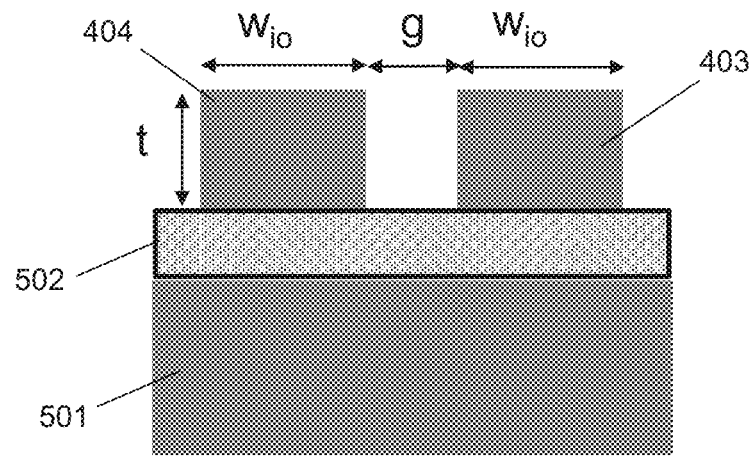
FIGS. 6A-6E show various cross-sectional views of the polarization stabilizer of FIG. 5.

FIG. 6A-6E show various cross-sectional views of the polarization stabilizer shown in FIG. 5. FIG. 6A corresponds to a cross-section along the line A-A' as shown in FIG. 5. As can be seen in this figure, the polarization stabilizer is built on a silicon-on-insulator platform. A silicon substrate 501, which may have a (1,0,0) crystalline orientation, is located beneath a buried oxide layer 502 which acts a cladding layer to the waveguides located above and may be around 0.4 µm tall (as measured from an upper surface of the silicon substrate to a lower surface of the waveguides). Along cross-section A-A', it can be seen that the first 403 and second 404 input waveguides have the same width, $w_{io}$, as measured perpendicularly to the guiding direction of the waveguides and parallel to the surface of the buried oxide layer 502. $w_{io}$ in this example takes a value of around 3 µm. Each of the input and output waveguides also have a thickness or height, as measured from an upper surface of the buried oxide layer to an upper surface of the respective waveguide, indicated by the reference t. In this example, t takes a value of around 1.5 µm.

Figure 6B:
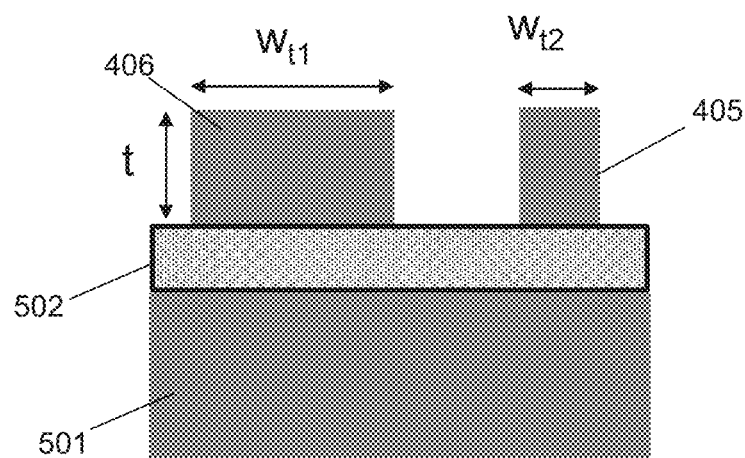

Referring now to FIG. 6B, this shows a cross-sectional view taken along the line B-B' as shown in FIG. 5. This cross-section is within the polarization splitter 402, and shows the disparity in width between the first intermediate waveguide 405 and second intermediate waveguide 406. As can be seen in the figure, the width of the first intermediate waveguide has decreased from $w_{io}$ to $w_{t2}$. Whereas, the width of the second intermediate waveguide 406 has increased from $w_{io}$ to $w_{t1}$. In some examples, the width of the second intermediate waveguide 406 does not vary, and so $w_{t1}$ is equal to $w_{io}$. The thickness, t, of the first and second intermediate waveguides has not varied.

Figure 6C:
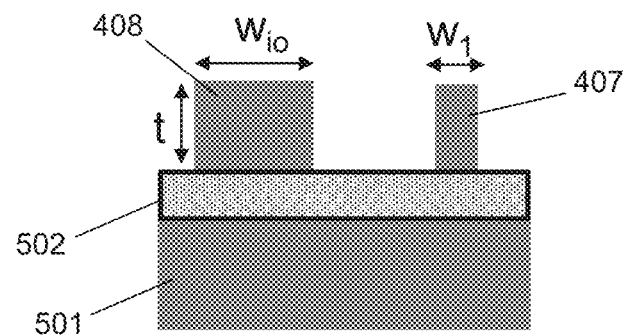

Next, FIG. 6C shows a cross-sectional view taken along the line C-C' as shown in FIG. 5. This cross-sectional view is between the polarization splitter 402 and the polarization rotator 100. The third intermediate waveguide 407, which is connects the first output of the polarization splitter and the polarization rotator, tapers inwards from $w_{io}$ to $w_1$-$w_1$ in this example has a value of around 0.75 µm. Whereas, the fourth intermediate waveguide 408, connected to the second output of the polarization splitter, has a width $w_{io}$ which remains constant. However, notably, both the third intermediate waveguide and the fourth intermediate waveguide have the same height or thickness t.

Figure 6D:
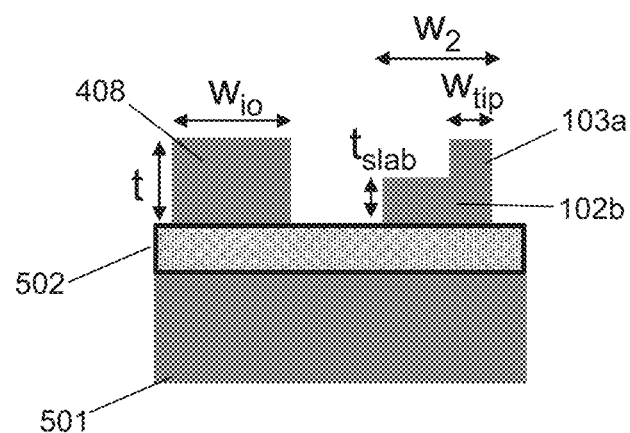

Referring now to FIG. 6D, this shows a cross-section taken along the line D-D' as shown in FIG. 5. This cross-sectional view is within the polarization rotator 100, at a point where the width of the slab portion 102 is at its maximum. As can be seen in this figure, one vertical side of the first ridge portion 103a is substantially aligned with the corresponding vertical side of the slab portion 102, whilst another vertical side of the first ridge portion is disposed at a point between the vertical edges of the slab portion. Generally, the polarization rotator as viewed in this cross-section can be considered as having a rotated shape. The first ridge portion has a width of $w_{tip}$, which is less than that of the slab portion which has a width of $w_2$. The slab portion has a thickness, as measured from an uppermost surface of the buried oxide layer 502 to an uppermost surface of the slab portion of $t_{slab}$. The thickness of the ridge portion, $t_{ridge}$, is such that $t_{ridge} + t_{slab}$=t (the thickness of the fourth intermediate waveguide).

Figure 6E:
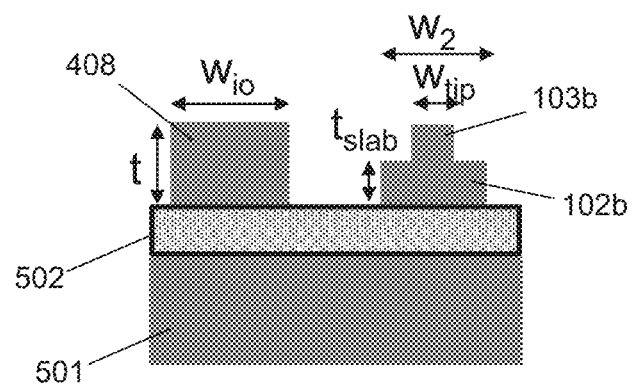

Next, FIG. 6E shows a cross-sectional view taken along the line E-E' as shown in FIG. 5. This cross-sectional view is also in the polarization rotator 100, at a point where the slab and rib portion connect to the output waveguide. A notable difference between this cross-section, and the one in FIG. 6D, is that, as shown, the second rib portion 103b is located in a substantially central point between the vertical edges of the slab portion 102b. The widths and thicknesses of the various components remain substantially identical, however due to the angled path which may describe the rib portion, neither of the vertical sides of the rib portion are aligned with either vertical side of the slab portion. Generally, the polarization rotator as viewed in this cross-section can be considered as having an inverse 'T' shape, where the bar of the T is provided by the slab region and the leg of the T is provided by the rib region.

Figure 7:
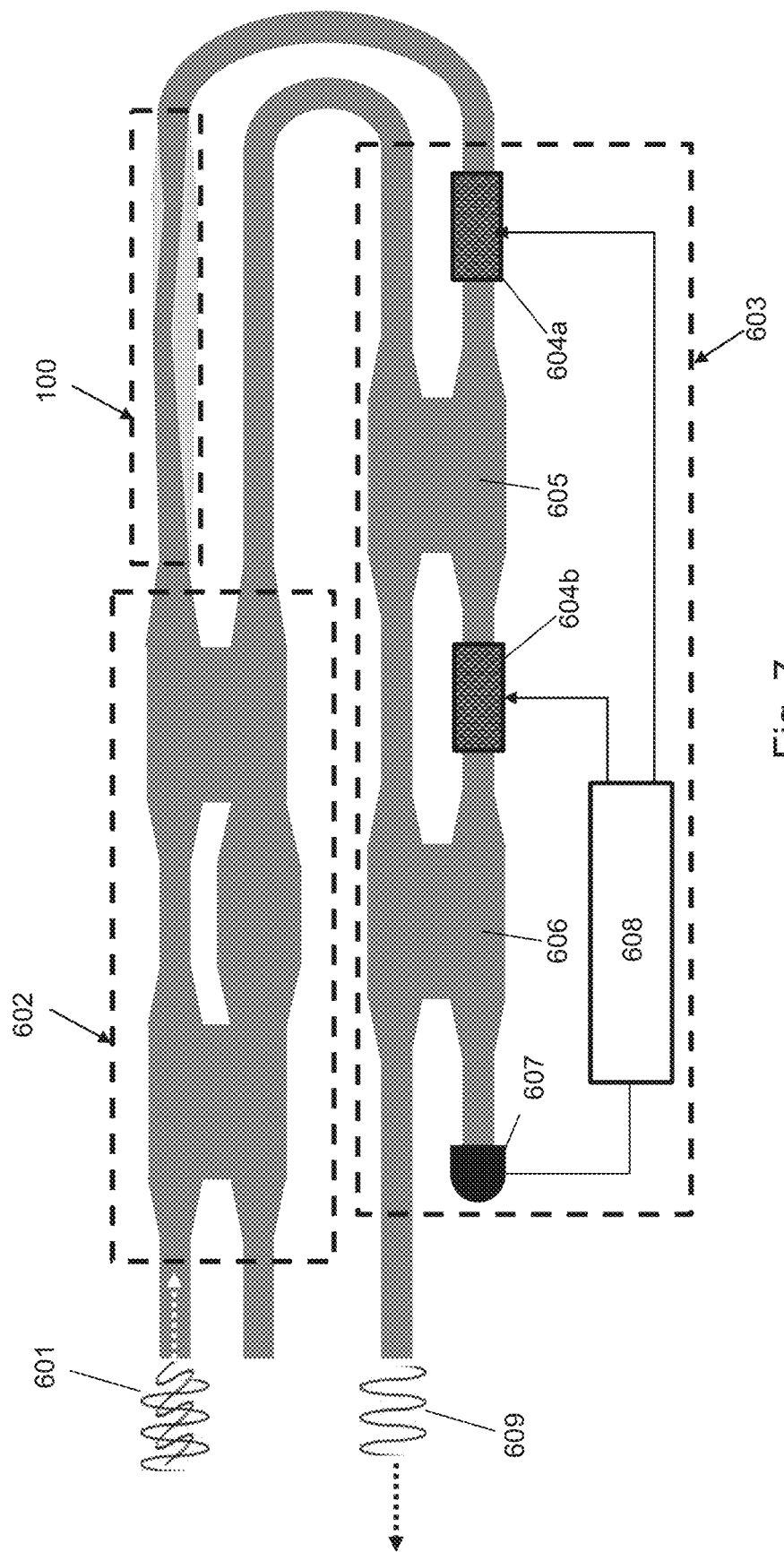
FIG. 7 shows a top-down view of a further polarization stabilizer according to embodiments of the present invention.

FIG. 7 shows a top-down view of a further polarization stabilizer according to embodiments of the present invention. Broadly, the stabilizer receives light 601 in a mixed or random polarization state (i.e. it comprises light in both the TE and TM polarization states). This light is passed through a polarization splitter 602, which provides TE polarized light to a first output and TM polarized light to a second output. One of the outputs is connected to a polarization rotator 100 as discussed above, which then rotates the polarization so as to match that provided by the other output of the splitter. These outputs, one from the splitter and one from the polarization rotator, may then be combined such that light 609 exits the device which is, essentially, in a single polarization state. For example, the polarization splitter 602 may operate so as to provide TM polarized light to the polarization rotator and TE polarized light to the other output. The polarization rotator is then operable to rotate the light such that it exits the polarization rotator in a TE polarization state. Thus, after recombination, light in a TE polarization is provided from the polarization stabilizer.

Generally, the above stabilizer may be referred to as a passive polarization stabilizer as is operable without any electronic control. The passive polarization stabilizer components may be monolithically integrated into a silicon photonic chip.

Optionally, the stabilizer may also include an active polarization stabilization circuit 603. Broadly, this active polarization stabilization circuit operates through modifying the phase of light in one of two intermediate waveguides such that light from each is combined in a coupler whilst minimising losses.

In more detail, a first heater 604a is provided in one of the two intermediate waveguides, and immediately before a first coupler 605. After the first coupler 605, a second heater 604b, is provide in a further intermediate waveguide which is connected to the second of the two coupler outputs of the first coupler. The second coupler has a preferred output connected to an output of the polarization stabilizer, and a second output. The heaters are operable to modify the phase of the light passing through the respective intermediate waveguides, such that light passing through the second coupler 606 preferentially exits though a first of two coupler outputs. The second output of the second coupler 606 is connected to a photodiode 607, which is operable to detect any light exiting the second coupler 606 through the second output. The photodiode, first heater, and second heater, are all connected to a controller 608. By using the detected light at the photodiode, the controller is operable to vary the degree of phase shift implemented by either or both of the heaters so as to minimise the amount of light exiting the second coupler via its second output. The photodiode may be a Germanium based photodiode, as it works in both the O- and C-band of wavelengths. The components other than the controller may, as with the passive components, be monolithically integrated into a silicon photonic chip. The controller may be implemented on a complementary metal-oxide-semiconductor chip, where the photodiode and heaters are wirebonded to the CMOS chip. The heaters may be formed of titanium, titanium nitride, or doped silicon.

Figure 8:
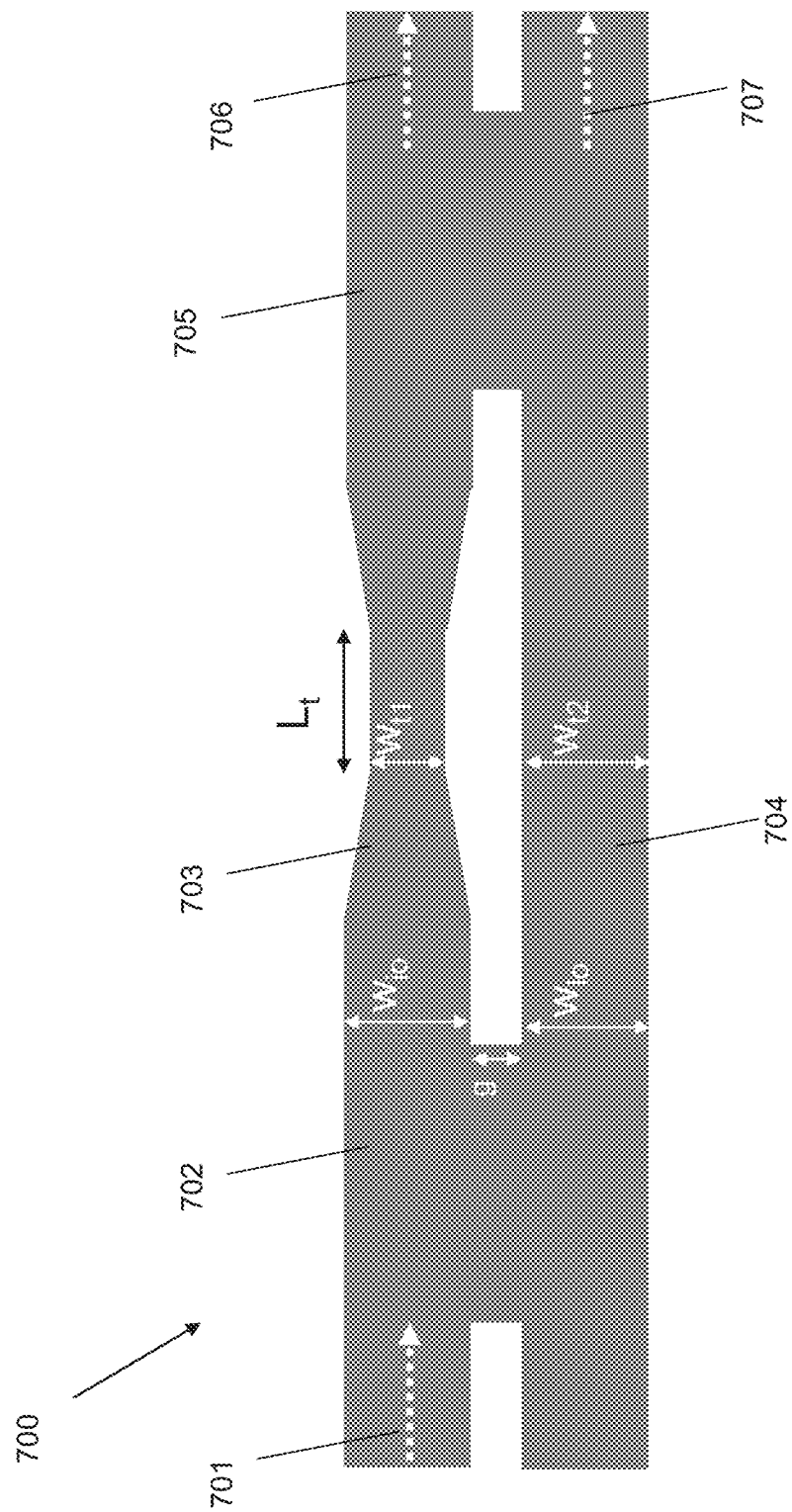
FIG. 8 shows one example of a polarization splitter.

FIG. 8 shows one example of a polarization splitter 700 which may be incorporated into the polarization stabilizer shown in FIG. 7. Broadly, the polarization splitter can be considered as a Mach-Zehnder interferometer, where the phase difference between the respective arms 703 and 704 may satisfy the equations:

$$\Delta\phi_{TE} = (\beta_{TE}(w_{t1}) - \beta_{TE}(w_{t2})) \cdot L_t = m_1 \pi$$

$$\Delta\phi_{TM} = (\beta_{TM}(w_{t1}) - \beta_{TM}(w_{t2})) \cdot L_t = m_2 \pi$$

Where $\beta_{TE}$ and $\beta_{TM}$ are the propagation constants of the TE and TM polarization states, respectively, $m_1$ and $m_2$ are integers, and $m_1 + m_2$ is odd. For a 1 μm-thick strip silicon waveguide, $m_1 = 3$ and $m_2 = 2$ is the solution with the smallest integers, which leads to the smallest value for $L_t$ which minimises the device footprint.

In more detail, the polarization splitter 700 is formed of an input waveguide 701 which receives light with components in both TE and TM polarization states. The light passes through a first multimode interference coupler 702 (in this instance functioning as a splitter), and provide to first intermediate waveguide 703 and second intermediate waveguide 704. The first intermediate waveguide tapers from a first width $w_{io}$ to a second width $w_{t1}$ and extends along a length $L_t$ with the width $w_{t1}$. After this length, the width of the first intermediate waveguide then increases from $w_{t1}$ back to $w_{io}$ before connecting to a second multimode interference coupler 705. In some examples, the second intermediate waveguide 704 has a width $w_{io}$ which remains constant, and the second intermediate waveguide couples an output of the splitter 702 to an input of the coupler 705. In other examples, the second intermediate waveguide has a first width $w_{io}$ which may taper to a second width $w_{t2}$. A gap g between the first intermediate waveguide and the second intermediate waveguide may be around 1.5 μm.

By applying the conditions above, namely the phase differences provided by the equations above, the splitter 700 can be configured such that light entering the device is preferentially divided into TE and TM polarized components which are provided to distinct outputs 706 and 707 of the second multimode interference coupler 705. It should be noted that the first multimode interference coupler includes, in this example, a second input waveguide. However in general it is not used.

In two example devices, the parameters above take the following values:

| Example | $m_1$ | $m_2$ | g | $w_{t1}$ | $w_{t2}$ | $L_t$ |
| --- | --- | --- | --- | --- | --- | --- |
| 1 | 6 | 7 | 1.5 μm | 1.32 μm | 3 μm | 139 μm |
| 2 | 6 | 7 | 1.5 μm | 1.39 μm | 2.5 μm | 180 μm |

In some examples, the taper widths i.e. $w_{t1}$ and $w_{t2}$ lie in the range 1 μm < $w_{ti}$ < 4 μm such that mode hybridization is avoided.

An example of the polarization splitter 700 above was simulated with the following device parameters:

| Parameter | Value (μm) |
| --- | --- |
| $w_{io}$ | 3 |
| g | 1.5 |
| $L_{mmi}$ | 302 |
| $w_{t1}$ | 1.3 |

| Parameter | Value (µm) |
|---|---|
| $w_{t2}$ | 3 |
| $L_t$ | 121 |
| Total device length | 725 |

Figure 9A:
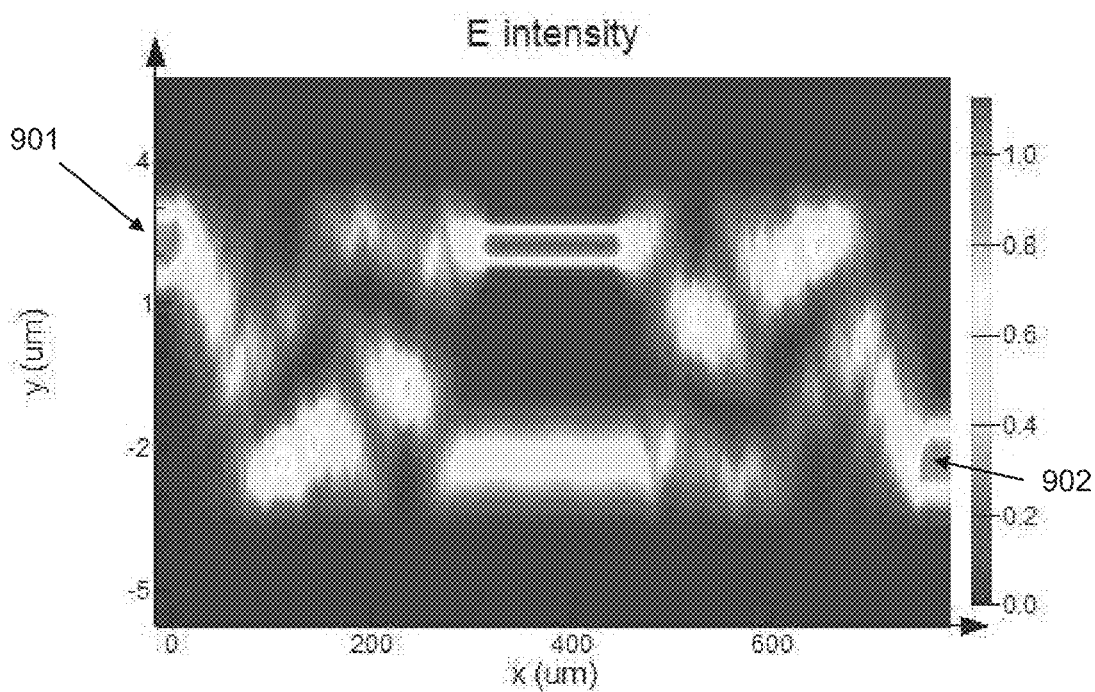
FIGS. 9A and 9B show the simulated E-field intensity for the polarization splitter shown in FIG. 8 for TE and TM polarized light respectively.
Figure 9B:
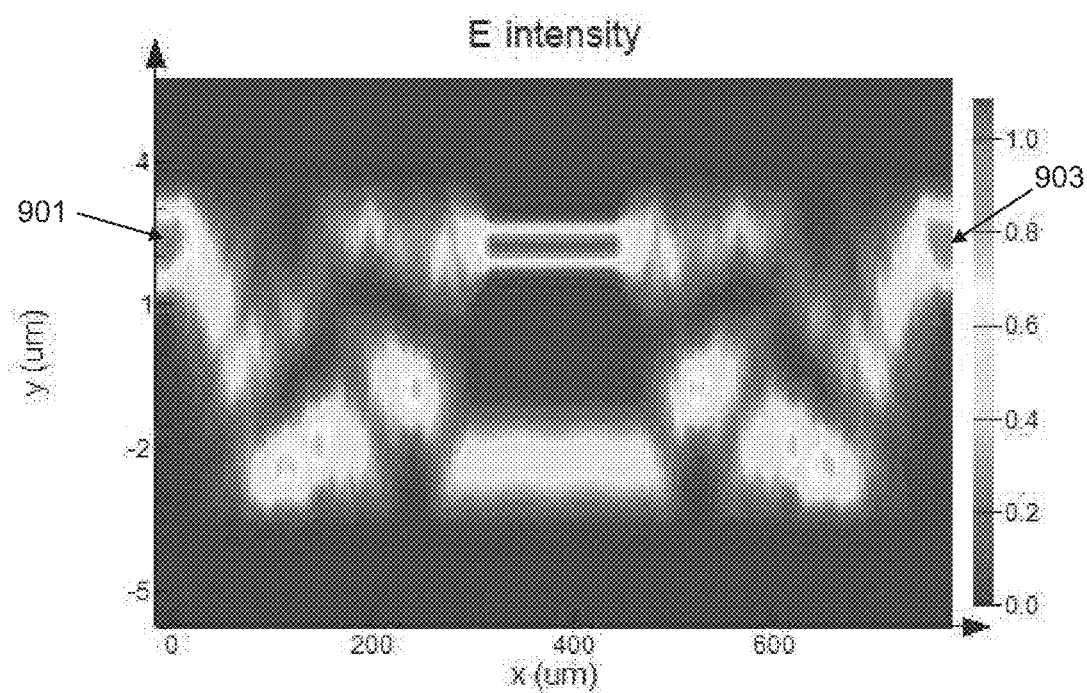

The results of this simulation are shown in FIGS. 9A and 9B respectively. FIG. 9A is a plot of E-field intensity as a function of position (x, y coordinate) where light is provided to an input 901. The input light in this simulation, which is for illustrative purposes only, is in a TE polarization state only. As can be seen in the plot, the light traverses the device (going along the x direction) before exiting the device through a first output 902. In contrast, as is shown in FIG. 9B, if light in a TM polarized state is provided to the same input 901, then the light traverses the device before exiting through a second output 903. Therefore, when light of mixed polarization states enters the device through input 901, light in a TE polarization state will be provided to first output 902, whilst light in a TM polarization state will be provided to second output 903, effectively splitting the light into the two polarization states.

Figure 10:
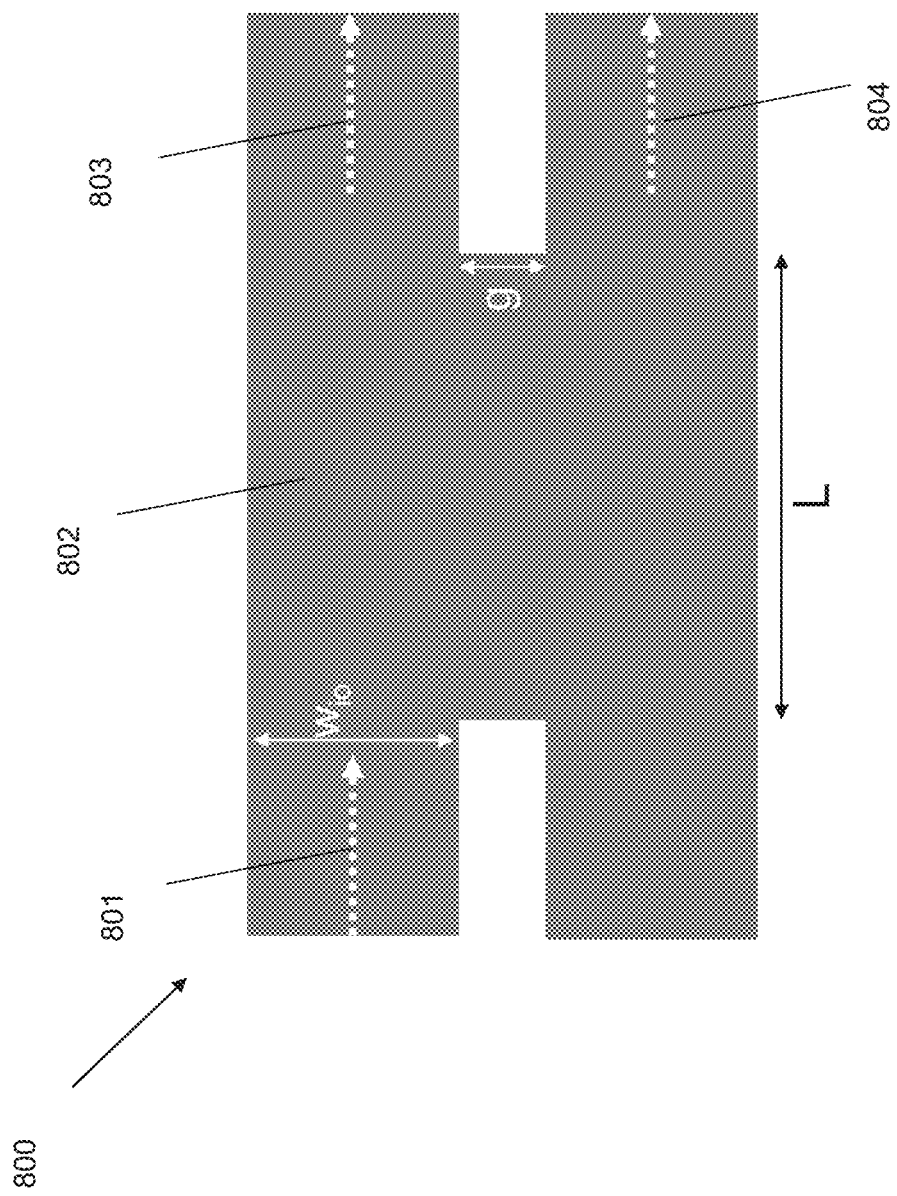
FIG. 10 shows another example of a polarization splitter.

FIG. 10 shows another example of a polarization splitter 800 which may be incorporated into the polarization stabilizer of FIG. 7. Broadly, the polarization splitter 800 is formed of a 2×2 multimode interference coupler (in this instance functioning as a splitter). In more detail, an input waveguide 802 is connected to a coupling region 802, which is respectively coupled to first 803 and second 804 output waveguides. As can be seen in the figure, the input waveguide has a width $w_{io}$, and a gap between the first and second output waveguides takes a value g. In one example, $w_{io}$ is 1.5 µm and g is 1 µm. The overall device may have length of 3.361 mm. Generally, the length of the multimode interference coupler should be the least common multiple of the self-imaging lengths of the light in the TE polarization state and the TM polarization state:

$$L_{MMI} = \frac{3}{2} \cdot L_\pi(TE) \cdot n_1 = \frac{3}{2} \cdot L_\pi(TM) \cdot n_2$$

Where $n_1$ and $n_2$ are integers.

Figure 11A:
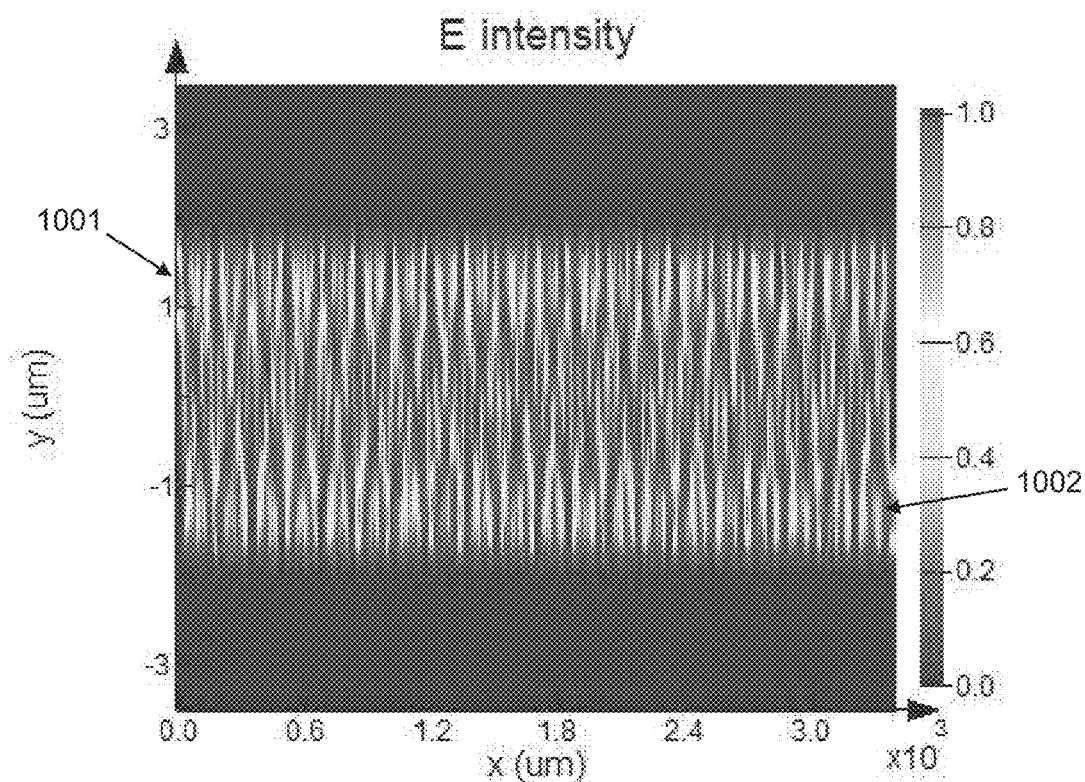
FIGS. 11A and 11B show the simulated E-field intensity for the polarization splitter shown in FIG. 10 for TE and TM polarized light respectively.
Figure 11B:
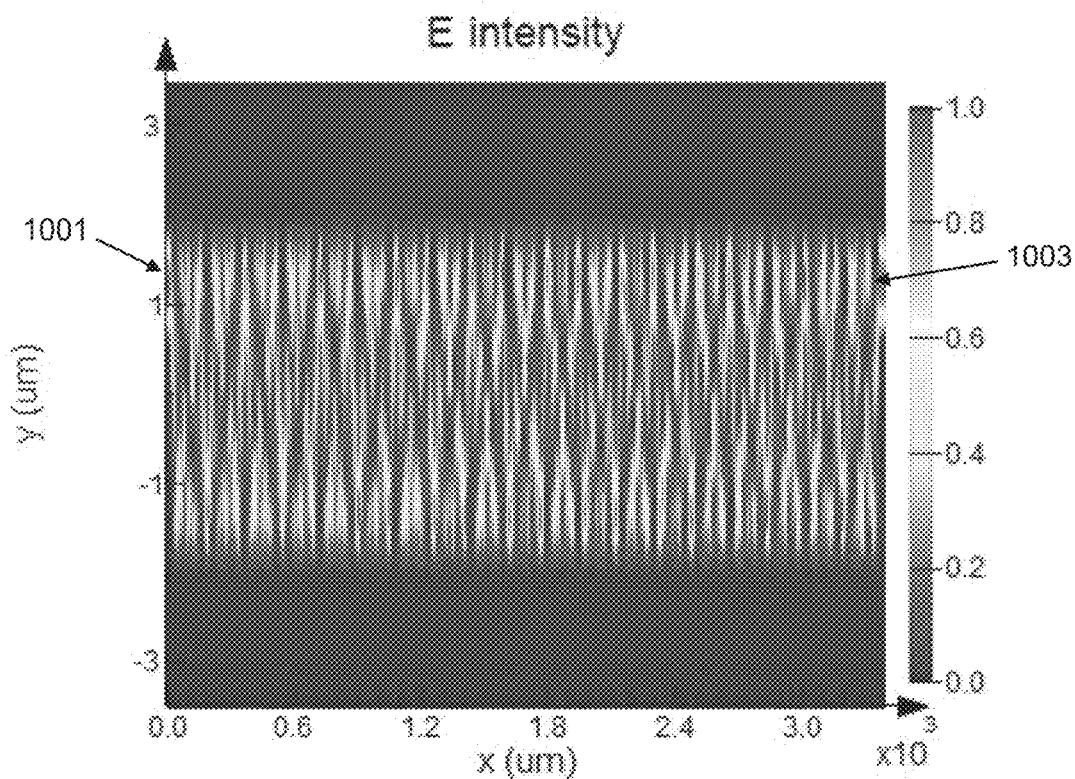

The device as discussed above, and as shown in FIG. 10, was simulated in a similar manner to the device shown in FIG. 8. The result of these simulations are shown in FIGS. 11A and 11B. As can be seen in FIG. 11A, when light of a pure TE polarization state is provided to the input 1001, only first output 1002 receives light passing through the device. Similarly, as can be seen in FIG. 11B, when light of a pure TM polarization state is provided to the input 1001, only second output 1003 receives light passing through the device. Therefore, if light of mixed polarization states enters the device through the input waveguide 1001, light in a TE polarization will be provided to first output 1002, whilst light in TM polarization state will be provided to second output 1003, effectively splitting the light into the two polarization states.

The polarization splitters shown in FIGS. 8 and 10 may be formed from silicon or silicon germanium. For example, they may be etched from a silicon-on-insulator wafer to provide silicon waveguides comprising the structure shown.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

100 Polarization rotator
101 Input waveguide
102 Slab portion
103 Ridge portion
104 Guiding direction
105 Output waveguide
401a-c Optical signal
402 Polarization splitter
403 Input waveguide
404 Input waveguide
405 First intermediate waveguide
406 Second intermediate waveguide
407 Third intermediate waveguide
408 Fourth intermediate waveguide
501 Silicon substrate
502 Buried oxide
601 Input optical signal
602 Polarization splitter
603 Active stabilizer circuit
604a,b Heater
605, 606 MMI coupler
607 Photodiode
608 Control circuit
609 Output light
700 Polarization splitter
701 Input waveguide
702 MMI coupler
703 First intermediate waveguide
704 Second intermediate waveguide
705 MMI coupler
706 First output waveguide
707 Second output waveguide
800 Polarization splitter
801 Input waveguide
802 MMI coupler
803 First output waveguide
804 Second output waveguide
901 Input
902 First output
903 Second output
1001 Input
1002 First output
1003 Second output

The invention claimed is:

1. A polarization rotator, including a rib waveguide, the rib waveguide including:
   a slab portion; and
   a ridge portion, which is disposed along a surface of the slab portion;
   wherein:
   the slab portion has a first slab region whose width, as measured in a direction perpendicular to a guiding direction of the rib waveguide, increases from a first slab width to a second slab width along a first length, and
   the ridge portion has a first ridge region whose width, as measured in the same direction as the slab widths, decreases from a first ridge width to a second ridge width along the same first length;
   such that the polarization rotator is configured to rotate the polarization of light during its transmission through the rib waveguide.

2. The polarization rotator of claim 1, wherein the polarization rotator has a length along the guiding direction of the rib waveguide of no less than 400 μm and no more than 950 μm.

3. The polarization rotator of claim 1, wherein the rib waveguide has a height, as measured from a lower surface of the slab portion to an upper surface of the ridge portion, of no less than 0.5 μm and no more than 1.5 μm.

4. The polarization rotator of claim 1, wherein more than 50% of the rotation occurs as light passes along the first length.

5. The polarization rotator of claim 1, wherein the slab portion includes a second slab region whose width remains constant along a second length.

6. The polarization rotator of claim 5, wherein a guiding direction of the first slab region is substantially aligned with a guiding direction of the second slab region.

7. The polarization rotator of claim 1, wherein the first slab width is no less than 0.5 μm and no more than 2 μm.

8. The polarization rotator of claim 1, wherein the second slab width is no less than 1 μm and no more than 2 μm.

9. The polarization rotator of claim 1, wherein the ridge portion includes a second ridge region whose width remains constant along a second length.

10. The polarization rotator of claim 9, wherein a guiding direction of the first ridge region is at an angle greater than 0° with a guiding direction of the second ridge region.

11. The polarization rotator of claim 9, wherein the second length is no less than 100 μm and no more than 150 μm and/or the first length may be no less than 300 μm and no more than 800 μm.

12. The polarization rotator of claim 9, further including an output waveguide, connecting output ports of the second ridge region and second slab region to an output port of the polarization rotator, and whose width broadens outwards in a direction from the output ports of the second ridge region and the second slab region to the output port of the polarization rotator.

13. The polarization rotator of claim 1, wherein it is operable at a wavelength of no less than 1.1 μm and no more than 1.7 μm.

14. The polarization rotator of claim 1, further including an input waveguide, connecting an input port of the polarization rotator to input ports of the first ridge region and first slab region, and whose width tapers inwards in a direction from the input port of the polarization rotator to the input ports of the first ridge region and first slab region.

15. A polarization stabilizer, including:
an input port;
a polarization-dependent splitter, which is connected to the input port and has two output ports; and
the polarization rotator of claim 1, connected to one of the output ports of the polarization-dependent splitter;
wherein the polarization-dependent splitter divides light received at the input port into a transverse-magnetic portion and a transverse-electric portion, one of which is delivered to the output port connected to the polarization rotator.

16. The polarization stabilizer of claim 15, wherein the polarization rotator has an output port, connected to a first waveguide which includes at least one heater, said heater being operable to alter the phase of light transmitted through the first waveguide.

17. The polarization stabilizer of claim 16, wherein the polarization-dependent splitter is connected to a second waveguide, and both the second waveguide and the first waveguide are connected to respective input ports of a coupler.

18. The polarization stabilizer of claim 15, wherein the polarization-dependent splitter is formed of a first intermediate waveguide and a second intermediate waveguide, both of which are coupled to the input port and which are respectively coupled to the output ports.

19. The polarization stabilizer of claim 18, wherein the first intermediate waveguide has a width which reduces from a first width to a second width along a direction parallel to the guiding direction of the first intermediate waveguide.

20. The polarization stabilizer of claim 18, wherein the second intermediate waveguide has a width which increases from a first width to a second width along a direction parallel to the guiding direction of the second intermediate waveguide.

21. The polarization stabilizer of claim 15, wherein the polarization-dependent splitter is operable to provide TM0 polarized light at a first output port of the two output ports, and TE0 polarized light at a second output port of the two output ports.

22. The polarization stabilizer of claim 21, wherein the polarization rotator is connected to the first output port and is operable to rotate the received light so as to output TE0 polarized light.

* * * * *